(12) United States Patent
Park

(10) Patent No.: US 10,732,613 B2
(45) Date of Patent: Aug. 4, 2020

(54) SMART FACTORY FOR PRODUCTION AND QUALITY MANAGEMENT OF THERMOPLASTIC AND THERMOSETTING COMPOUND

(71) Applicant: DYM SOLUTION CO., LTD., Chungcheongnam-do (KR)

(72) Inventor: Dong Ha Park, Seoul (KR)

(73) Assignee: DYM Solution Co., Ltd., Chungcheongnam-do (KR)

( * ) Notice: Subject to any disclaimer, the term of this patent is extended or adjusted under 35 U.S.C. 154(b) by 92 days.

(21) Appl. No.: 15/962,159

(22) Filed: Apr. 25, 2018

(65) Prior Publication Data

US 2018/0314241 A1   Nov. 1, 2018

(30) Foreign Application Priority Data

Apr. 27, 2017   (KR) .................. 10-2017-0054075

(51) Int. Cl.
G05B 19/418   (2006.01)
(52) U.S. Cl.
CPC .  *G05B 19/41865* (2013.01); *G05B 19/41875* (2013.01); *G05B 2219/32252* (2013.01); *G05B 2219/32368* (2013.01)
(58) Field of Classification Search
USPC ...................................................... 700/109
See application file for complete search history.

(56) References Cited

U.S. PATENT DOCUMENTS

2006/0138690 A1*  6/2006  Schwaiger .............. B29C 48/92
                                                      264/40.6
2009/0094080 A1*  4/2009  Luotojarvi ......... G05B 19/4184
                                                      705/7.15

FOREIGN PATENT DOCUMENTS

KR    10-2014-0056770 A     5/2014
KR       2014 0056770 A  *  5/2014  ............. G06Q 50/04
KR       2017-0032728 A     3/2017

OTHER PUBLICATIONS

Office Action dated Sep. 18, 2018, in KR Application No. 10-2017-0054075, with English translation.
"The IIoT Data Infrastructure for the smart factory realization," Mar. 30, 2017, OSIsoft Korea, 30 pages.

* cited by examiner

*Primary Examiner* — Mohammad Ali
*Assistant Examiner* — Joshua T Sanders
(74) *Attorney, Agent, or Firm* — Foley & Lardner LLP

(57) ABSTRACT

Provided is a smart factory for production and quality management of a thermoplastic and thermosetting compound capable of predicting and controlling quality and production schedule in the future as well as monitoring a current state of factory by acquiring various types of data generated during a manufacturing process such as a manufacturing schedule, a quality condition, or the like of a manufacturing process.

7 Claims, 3 Drawing Sheets

SMART FACTORY FOR PRODUCTION AND QUALITY MANAGEMENT OF THERMOPLASTIC AND THERMOSETTING COMPOUND

CROSS-REFERENCE TO RELATED APPLICATIONS

This application claims priority under 35 U.S.C. § 119 to Korean Patent Application No. 10-2017-0054075, filed on Apr. 27, 2017, in the Korean Intellectual Property Office, the disclosure of which is incorporated herein by reference in its entirety.

TECHNICAL FIELD

The following disclosure relates to a smart factory for production and quality management of a thermoplastic and thermosetting compound, and more particularly, to a smart factory for production and quality management of a thermoplastic and thermosetting compound capable of predicting and controlling quality and production schedule in the future as well as monitoring a current state of factory by acquiring various types of data generated during a manufacturing process such as a manufacturing schedule and a quality condition of a manufacturing process.

BACKGROUND

The Internet of Things (IoT) is a technology that connects various kinds of things with embedded sensors and communication functions to the Internet. The Internet of Things allows various kinds of things to provide measured information to a user or allows the user to control things, to which the Internet of Things is applied, using the Internet of Things.

Recently, there has been a tendency to apply the Internet of things to various fields. As one example of these fields, Korean Patent Laid-Open Publication No. 2017-0032728 ("Animal Management System based on Internet of Things and Providing Method thereof", Mar. 23, 2017, hereinafter, related art 1) is disclosed. The related art relates to a system for managing animals based on the Internet of things, which senses information on a state of animals that are being raised and barn environment, provides the user with the sensed information, and controls the barn environment based on the sensed information.

The Internet of things may be applied not only to the barn management of the related art 1 but also to a production factory of a manufacturing industry. However, as the production processes of the manufacturing industry become complicated recently, there are not many cases in which the Internet of things is applied only to some of the production processes of the manufacturing industry and the things of Internet is applied to all the production processes such as production request, raw material management, and production facility management to configure a single system.

RELATED ART DOCUMENT

[Patent Document]

Korean Patent Laid-Open Publication No. 2017-0032728 ("Animal Management System based on Internet of Things and Providing Method thereof", Mar. 23, 2017)

SUMMARY

An embodiment of the present invention is directed to providing a smart factory capable of controlling all production processes such as raw material management, order reception, production control, production facility management, and quality management using the Internet of Things in production and quality management of a thermoplastic and thermosetting compound.

In one general aspect, a smart factory includes: a human & machine interface (HMI) controlling a production facility according to a state of the production facility; a quality management system (QMS) performing a quality inspection on workpiece for each step produced in the production facility and controlling the production facility according to a quality result; a computerized maintenance management system (CMMS) managing the production facility based on an operation time of the production facility; a storage unit storing information on the state of the production facility, a production parameter, information on a facility operation, an operation condition, and information on the quality inspection of a product in real time; and a manufacturing execution system (MES) transmitting the information stored in the storage unit in real time, continuously feeding back a predetermined item to a user, or controlling the production facility.

The HMI and CMMS may include a first measuring unit which measures an operation state and an operation time of the production facility and transmit the measured operation state and operation time to the storage unit.

The QMS may include a second measuring unit which measures quality on workpiece for each step produced in the production facility and transmits the measured information to the storage unit.

The smart factory may further include: an energy management system (EMS) controlling the production facility according to a power consumption amount of the production facility.

The CMMS may store in the storage unit a fact that the operation of the production facility stops if a total sum of the operation time of the production facility exceeds a predetermined reference time or the operation time of the production facility exceeds the reference time, and the MES may notify a user that the operation time of the production facility exceeds the reference time.

The MES and the storage unit may be connected to an Internet network, and the user may access the storage unit to confirm the stored state information or access the MES to control the production facility.

The storage unit may include first storage units which store information on a state of a production facility of a single factory and operation information on the MES and a second storage unit which is connected to at least one of the first storage units in parallel to store the information stored in the first storage units and store production planning information on a factory in which each of the first storage units is installed.

The smart factory may further include: enterprise resource planning (ERP) connected to the Internet to receive order information, determine the operation of the production facility according to the production plan, and manage a warehousing management of raw materials and a delivery of a finished product.

Other features and aspects will be apparent from the following detailed description, the drawings, and the claims.

DETAILED DESCRIPTION OF MAIN ELEMENTS

10: Production facility
20: HMI, QMS, CMMS, EMS
30: MES
50: User
60: Factory
70: Customer
100: Supplier
110: Supply device
200: Extruder
300: Three-dimensional protrusion measurement apparatus
400: Rolled extrusion tape

DETAILED DESCRIPTION OF EMBODIMENTS

The present invention relates to a smart factory for production and quality management of a thermoplastic and thermosetting compound. Accordingly, the present invention may be applied to the whole production process for producing a thermoplastic and thermosetting compound. In the present specification, an example of applying the smart factory for production and quality management of a thermoplastic and thermosetting compound to a process of producing a cable and wire coating compound will be described in detail.

Figure 1:
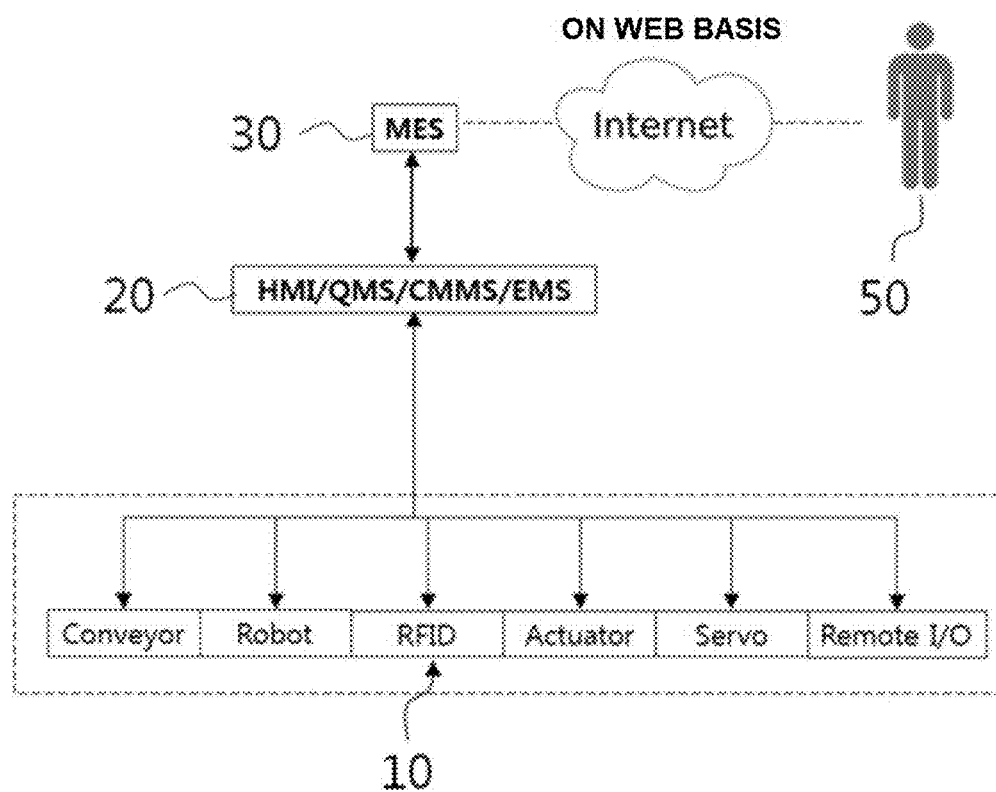
FIG. 1 is a schematic diagram of the present invention applied to a single factory.
Figure 2:
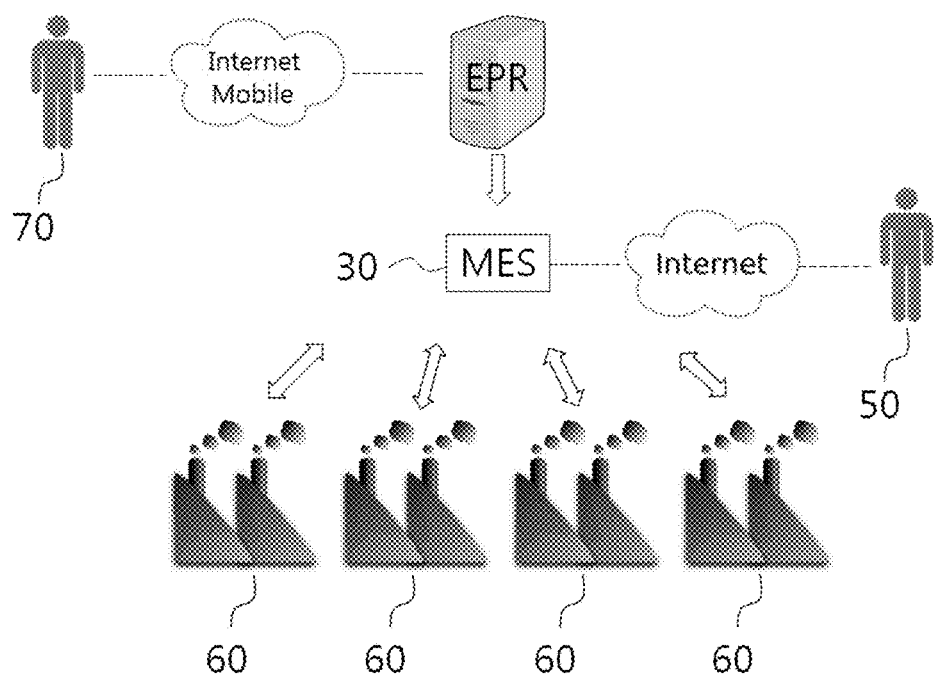
FIG. 2 is a schematic diagram of the present invention applied to a plurality of factories.

FIG. 1 schematically shows a smart factory for production and quality management of a thermoplastic and thermosetting compound according to the exemplary embodiment of present invention applied to a single factory and FIG. 2 schematically shows the smart factory for production and quality management of a thermoplastic and thermosetting compound according to the exemplary embodiment of the present invention applied to a plurality of factories.

The major features of the smart factory for production and quality management of a thermoplastic and thermosetting compound according to the exemplary embodiment of the present invention are as follows. 1. Quality management of production facilities and products can be made, 2. Order and production planning can be easily established, 3. Users or customers can easily perform features Nos. 1 and 2 using the Internet or mobile. Hereinafter, features Nos. 1 to 3 of the smart factory according to the exemplary embodiment of the present invention will be sequentially described in detail, and then the concrete example in which the smart factory according to the exemplary embodiment of the present invention may be applied will be described by way of example.

The smart factory for production and quality management of a thermoplastic and thermosetting compound according to the exemplary embodiment of the present invention may include HMI, QMS, CMMS, a storage unit, and MES.

The computerized maintenance management system (CMMS) manages a production facility based on an operation time of the production facility. The CMMS manages production facility based on the operation time of the production facility to increase the reliability and efficiency of the production facility and secure the stable quality, thereby securing the corporate competitiveness. The CMMS analyzes and predicts optimum conservation methods for each facility to derive conservation activities for securing the corporate competitiveness. As shown in FIG. 1, the production facility managed by the CMMS may be a variety of production facilities 10 such as a conveyor, a robot, an RFID, an actuator, a servo motor, and a remote I/O which are used in the production process. The CMMS can normally operate the production facilities 10 for the above-mentioned purposes, and can check and replace in advance the corresponding facilities which are predicted to fail to maximize the reliability and efficiency of the facilities, thereby improving productivity and quality.

In order for the CMMS to predict the failure of the production facility, a means for measuring the state of the production facility is required. To this end, the CMMS may include a first measuring unit.

The first measuring unit may be installed in the production facility 10 in a form of a sensor or a program to transmit information on the production facility 10 to the CMMS. The information on the production facility measured by the first measuring unit may be at least one of the operation time of the production facility and the operation condition.

Measuring the operation time of the production facility by the first measuring unit is to predict the lifespan of the production facility by measuring the total operation time of the production facility and allow the user to manage the production facility according to the predicted lifespan of the production facility. When the total sum of the operating time of the production facility measured by the first measuring unit exceeds a reference value, the CMMS may stop the operation of the corresponding production facility or notify the user that the operation time exceeds the reference value.

The reference value of the operation time on which the CMMS controls the operation of the production facility may be determined on the basis of the operation limit time set or recommended when the production facility is manufactured. For example, assuming that an operation limit time of the production facility is 1000 hours, the CMMS may notify a user every time the total sum of the operation time of the production facility exceeds 700, 800, 900, and 1000 hours by setting 700, 800, 900, and 1000 hours, which are 70%, 80%, 90%, and 100% of the operation limit time, as a reference time. In particular, if the operation time of the production facility exceeds 1000 hours, the operation of the corresponding production facility may stop. The user checks the corresponding facility to which a facility management manager issues a warning, and if there is no abnormality, the facility management manager verifies and predicts the facility to continuously use the facility in such a manner of increasing the operation limit time of the corresponding facility by a certain period of time or resetting the operation time or if the defect is found after the checking, may replace or repair the corresponding facility.

The state information of the production facility measured by the first measuring unit is stored in the storage unit, and the storage unit may visualize the state information. There may be various methods of allowing the CMMS to notify the user that the operation time of the production facility reaches a reference value on step-by-step basis. One of the methods, there may be methods of changing a color for the production facility whose operation time exceeds the reference value among the production facilities stored and visualized in the storage unit.

The human & machine interface (HMI) controls the production facility according to the state of the production facility. The state of the production facility as a control reference of the HMI refers to the condition and the measurement value when the production facility is driven, which may typically be information such as a driving voltage of the production facility, a facility temperature, and vibration or noise generated by the production facility. The HMI may include the first measuring unit which is included in the CMMS to measure the state of the production facility as described above. The HMI measures the state of the production facility by the first measuring unit to determine whether the production facility is normally operated, and the HMI may control whether the production facility is operated depending on whether the state of the production facility measured by the first measuring unit is out of the reference range or may store the measured state of the production facility in the storage unit to be described later.

The information measured by the first measuring unit may be transmitted to and stored in the storage unit to be described later.

The quality management system (QMS) performs a quality inspection on workpiece on step-by-step basis produced in the production facility, and controls the production facility according to the quality results. The QMS may include a second measuring unit for performing the quality inspection on the workpiece on step-by-step basis. There are two main methods of allowing the QMS to manage quality: one is to measure the manufacturing environment of products produced in production facilities to measure whether the corresponding workpiece is defective, and the other is to separately measure the quality of products produced in production facilities. As the method of measuring the quality of the workpiece in the QMS is divided as described above, the second measuring unit may also be divided into two methods.

Figure 3:
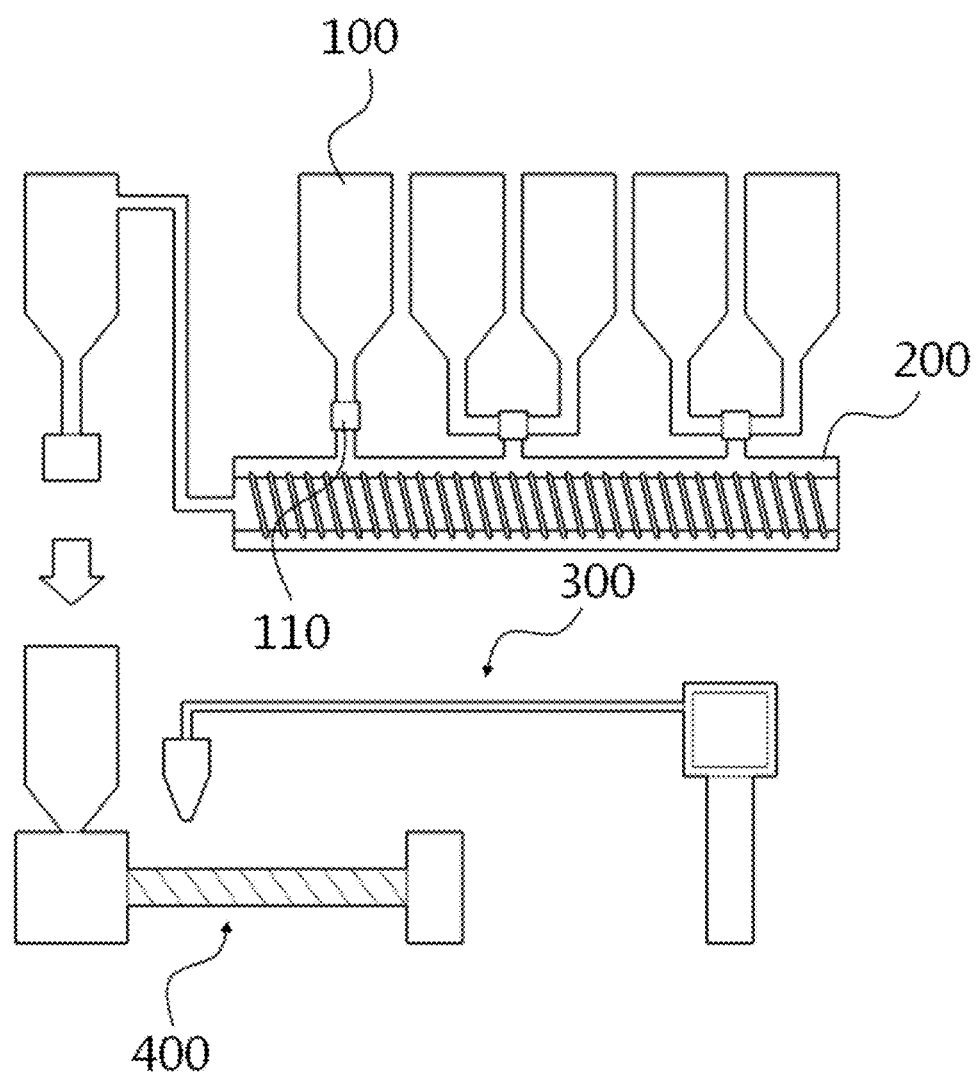
FIG. 3 is a partial schematic view of a process of producing a cable and wire compound to which the present invention is applied.

The operation of the QMS will be described with reference to FIG. 3. FIG. 3 shows a part of a process of producing a cable and wire compound to explain an example where the smart factory according to the exemplary embodiment of the present invention is applied to the process of producing a cable and wire compound.

The process of producing a cable and wire compound by coating a cable used for manufacturing industry or industrial use are divided into four steps which are sequentially performed. The QMS may be applied to each of four steps of producing the cable and wire compound, and may include first to fourth QMSs for measuring the quality of a workpiece during the process or after the process ends, in which the first to fourth QMSs may each include the second measuring unit.

FIG. 3 schematically illustrates the first two steps of the process of producing a cable and wire compound described above. The first step in the process of producing a cable and wire compound is the process of weighing raw materials. A supplier 100 shown in FIG. 3 serves to supply a plurality of raw materials to an extruder 200. Some of the raw materials may be supplied to the extruder 200 alone, and some of the raw materials may be supplied to the extruder 200 while being mixed with each other. At this time, the raw materials which are supplied to the extruder 200 should be supplied at a predetermined ratio. The first QMS may measure whether to feed the raw materials depending on predetermined supply speeds of the raw materials supplied from each of the suppliers 100 by the second measuring unit installed between the supplier 100 and the extruder 200 or the supplier 100 itself, and controls a supplying device 110 (for example, pump) supplying the raw materials from the supplier 100 to the extruder 200 to control the supply speed of the raw materials to be in a predetermined range if the supply speed of the raw materials does not match the predetermined speed.

That is, the first QMS may control each raw material to be accurately measured within a predetermined range and put the accurately measured raw materials in a mixer.

In the second step of the process of producing a cable and wire compound, a semi-finished product (a product in a state in which no cross-linking agent is mixed) mixed and extruded by the extruder 200 is manufactured, a prototype is manufactured using the semi-finished product, and then it is inspected whether a quality of the prototype is equal to or more than a predetermined reference. As illustrated in FIG. 3, in the inspecting step, after an extrusion tape 400 which is the prototype is manufactured using the semi-finished product manufactured by the extruder 200 and rolled in a spiral shape, the second QMS inspects the rolled extrusion tape 400 by a three-dimensional protrusion measurement apparatus 300. In the process of measuring the protrusion, if the size and number of protrusions found on the surface of the tape having a predetermined length is out of a reference range, the second QMS determines the tape as a defective product, and if the size and frequency of protrusions found on the surface of the tape having a predetermined length are within the reference range, the second QMS determines the tape as a normal product. Thereafter, the following process is performed. As an example of the reference values for the size and number of protrusions, the number of protrusions having a size of 40 to 49 μm per 1 $m^2$ of the rolled extrusion tape 400 should be equal to or smaller than 10, the number of protrusions having a size of 50 to 59 μm should be equal to or smaller than 5, the number of protrusions having a size of 60 to 74 μm should be equal to or smaller than 1, and the protrusions equal to or larger than 75 μm are not present.

Since the above-described process is a method of measuring a state of a workpiece after manufacturing a workpiece by an inspection, the second measuring unit included in the second QMS may be a separate apparatus such as the three-dimensional protrusion measurement apparatus 300.

The third step in the process of producing a cable and wire compound is a step of mixing the cross-linking agent, which proceeds if it is determined that there is no abnormality in the second QMS. Major factors in the step of mixing the cross-linking agent include the temperature and weight of pellet before the mixing of the cross-linking agent, the mixing time of the cross-linking agent, the amount of the cross-linking agent, and the time of the cross-linking agent, and the normal range of the factors is set in advance. When the above-mentioned factors are out of the reference range during the mixing process of the cross-linking agent, the third QMS may control the production facility performing the mixing process of the cross-linking agent to maintain the factors outside the reference range to be within the reference range.

The fourth step of producing a cable and wire compound is a step of packing the cable and wire compound after the third step is performed, and proceeds when the third step managed by the third QMS normally proceeds. The fourth QMS checks the packaging quality and quantity of the product, and if the fourth QMS determines that the package and quantity of the product are correct, the corresponding product may be delivered to a customer.

The storage unit stores information on a state of a production facility, production parameters, information on a facility operation, operation conditions, and information on quality inspection of a product in real time. The storage unit is not separately shown in the drawing. The information stored in the storage unit may be the state of the workpiece measured by the first measuring unit and the second measuring unit, and the information on the operation of the HMI, the CMMS, and the QMS may be stored.

The information stored in the storage unit may be data-based, and the information stored in the storage unit may be visualized and provided to a user. Describing the operation of the CMMS by way of example, a schematic diagram of each production facility is provided to a user. Whenever the cumulative operation time of each production facility measured by the CMMS is added in units of 10% of the operation limit time, there may be a method of changing colors of schematic diagrams for each production facility from blue to red. Since visualizing the information stored in the storage unit and providing the visualized information to the user is intuitive, it is easier for the user to handle a large amount of information.

The storage unit may have a first storage unit and a second storage unit. The first storage unit is applied to each production site, i.e., each factory, and may store information like a workstation and may be an electronic device capable of wired/wireless communication. The second storage unit may be a server that receives information from the first storage unit installed in a plurality of factories, i.e., each factory, and a plurality of first storage units are connected with a second storage unit in parallel, and the second storage unit may manage the information transmitted from the first storage unit by each factory. The second storage unit may store production schedules of each factory 60 through the information stored for each factory.

The HMI, CMMS, and QMS may be a system applied to each factory, and a system applied to two factories.

The manufacturing execution system (MES) may transmit the information stored in the storage unit in real time, continuously feedback predetermined items to a user, or control the production facility. For example, if the operation of the QMS is to be mainly fed back in order to improve the quality of the compound during the process of producing the compound, the user can set the entire operation of the QMS as a management target. The MES analyzes the state transition of the workpiece measured by the QMS to predict the defect rate or to continuously feedback the current state to the user. As another example of the MES, when the user manages the cumulative operation time of the production facility measured by the CMMS for management of the production facility, the MES analyzes the transition of the cumulative operation time of the corresponding production facility stored in the storage unit and predicts a check date, and notifies the user of the check date.

The present invention may further include an energy management system (EMS) for controlling the production facility according to the power consumption amount of the production facility, similar to the HMI, CMMS and QMS. The EMS may measure the amount of power used by each production facility through a third measuring unit installed for each production facility, similar to the HMI, QMS, and CMMS, and manage/predict the operation of the corresponding production facility according to the measured amount of power used. The third measuring unit may be implemented in a form of a program in a watt-hour meter or a production facility, the information measured by the EMS and the operation information of the EMS are stored in the storage unit in real time, and the stored information is transmitted to the MES in real time so that the MES may manage/predict the power of the production facility.

The MES and the storage unit are connected to the Internet network, and the user can access the storage unit to confirm the stored state information or access the MES to control the production facility. The user may access the MES or the storage unit through a terminal capable of the wired/wireless communication.

As shown in FIG. 2, the smart factory according to the exemplary embodiment of the present invention may further include enterprise resource planning (ERP) which is connected to the Internet to receive order information, determine the operation of the production facility according to the production plan, and manage the warehousing management of raw materials and the delivery of the finished product. A customer 70 may access a program provided by the ERP via the Internet or a mobile device to order an order quantity of a product. The ERP may order the production planning to the production factory that has room for the production planning so that the product ordered by the customer 70 may be produced and delivered on time in consideration of the production schedule and the production planning for each factory 60 stored in the second storage unit. The process of establishing the production planning may be performed by the ERP itself, and a user 50 can access the ERP to manually establish the production planning.

When the ERP establishes the production planning, the ERP may warehouse the raw materials according to the production planning and manage the delivery of the products manufactured after the production planning is completed.

According to the smart factory according to the exemplary embodiment of the present invention as described above, it is possible to facilitate the order reception, the production planning, the warehousing management of raw materials, and the delivery management of finished products. In addition, according to the exemplary embodiment of the present invention, since the quality in the whole production process of the product is controlled based on the QMS in the production process of the product, the quality of the finally produced product may be improved.

The above example briefly describes application of the smart factory according to the exemplary embodiment of the present invention to the process for producing a cable and wire compound, but the present invention is not limited to the above-mentioned exemplary embodiment, and application ranges of thermoplastic or thermosetting compound are various, and it is needless to say that various modifications may be made without departing from the gist of the present invention as claimed in the claims.

What is claimed is:

1. A smart factory for production and quality management of a thermoplastic and thermosetting compound, comprising:
   a human & machine interface (HMI) controlling a production facility according to a state of the production facility;
   a quality management system (QMS) performing a quality inspection on a workpiece for each step produced in the production facility and controlling the production facility according to a quality result;
   a computerized maintenance management system (CMMS) managing the production facility based on an operation time of the production facility;
   a storage unit storing information on the state of the production facility, a production parameter, information on a facility operation, an operation condition, and information on a quality inspection of a product in real time; and
   a manufacturing execution system (MES) transmitting the information stored in the storage unit in real time, continuously feeding back a predetermined item to a user, or controlling the production facility, wherein:

in at least one quality inspection, an appearance of a prototype is inspected to determine whether the appearance of the prototype is within a predetermined reference range, and when it is determined that the appearance of the prototype is within the predetermined reference range, the prototype is carried on to a next step produced in the production facility, wherein the prototype is prepared by a process comprising the steps of:

mixing and extruding a thermoplastic and thermosetting compound via an extruder to form a semi-finished product, and producing the prototype from the semi-finished product; and the QMS includes a second measuring unit which inspects the appearance of the prototype and measures quality on the workpiece for each step produced in the production facility.

2. The smart factory of claim 1, wherein the HMI and CMMS include a first measuring unit which measures an operation state and an operation time of the production facility and transmits the measured operation state and operation time to the storage unit.

3. The smart factory of claim 1, further comprising: an energy management system (EMS) controlling the production facility according to a power consumption amount of the production facility.

4. The smart factory of claim 1, wherein when a total sum of the operation time of the production facility exceeds a predetermined reference time, the CMMS stops the operation of the production facility or stores in the storage unit a fact that the operation time of the production facility exceeds the predetermined reference time, and the MES notifies the user that the operation time of the production facility exceeds the predetermined reference time.

5. The smart factory of claim 1, wherein the MES and the storage unit are connected to an Internet network, stored state information in the storage unit is provided to the user if the user accesses the storage unit through the Internet network, and control authority of the production facility is provided to the user if the user accesses the MES through the Internet network.

6. The smart factory of claim 1, wherein the storage unit comprises first storage units which store information on a state of a production facility of a single factory and operation information on the MES and a second storage unit which is connected to at least one of the first storage units in parallel to store the information stored in the first storage units and store production planning information on a factory in which each of the first storage units is installed.

7. The smart factory of claim 1, further comprising: enterprise resource planning (ERP) connected to the Internet to receive order information, determine operation of the production facility according to a production plan, and manage warehousing of raw materials and a delivery of a finished product.

* * * * *